Sept. 12, 1967 P. MAUCHER 3,340,974
FRICTION CLUTCH, ESPECIALLY FOR MOTOR VEHICLES
Filed Oct. 24, 1965 2 Sheets-Sheet 2

United States Patent Office 3,340,974
Patented Sept. 12, 1967

3,340,974
FRICTION CLUTCH, ESPECIALLY FOR
MOTOR VEHICLES
Paul Maucher, Stuttgart-Gablenberg, Germany, assignor to Luk Lamellen und Kupplungsbau Gesellschaft mit beschrankter Haftung, Buhl, Baden, Germany
Filed Oct. 24, 1965, Ser. No. 504,348
Claims priority, application Germany, Oct. 26, 1964,
L 49,114
8 Claims. (Cl. 192—68)

ABSTRACT OF THE DISCLOSURE

The present invention relates to a friction clutch for motor vehicles according to which an annular cover plate is connected to the flywheel while an annular dish-spring arranged between said cover plate and said flywheel has its outer edge portion resting on the pressure plate and has its inner marginal portion provided with circumferentially spaced recesses so as to form radially inwardly extending and circumferentially spaced tongues. Only the inner end portions of said tongues are engaged by the inner edge portions of the cover plate so that between the inner edge portions of said cover plate and the inner edge portions of said recesses there will be formed air passage means for cooling said dish-spring.

The present invention relates to a friction clutch for motor vehicles which comprises a follower disc nonrotatably but axially displaceably connected to the output shaft, and also comprises a clutch cover fixedly connected to the flywheel, and furthermore comprises a pressure plate which is guided in said cover through the intervention of cam means, said pressure plate being operable by lever means arranged on said cover. The friction clutch also includes a dish-spring arranged between the pressure plate and the cover for producing the desired pressing forces. Heretofore known clutches of the above-mentioned type have the drawback that they have a rather varying torque measured over the path of the wear area of the friction lining of the friction disc. Moreover, the supports for the lever means are expensive from a structural and manufacturing standpoint inasmuch as such lever supporting means require bearing supports to be riveted to the cover.

A further drawback of the heretofore known friction clutches of the above-mentioned type consists in the partially complicated arrangement of the spring means serving as return springs and in that said springs, due to the way in which they are mounted, are affected unfavorably by centrifugal forces.

It is, therefore, an object of the present invention to provide a friction clutch for motor vehicles, which will overcome the above-mentioned drawbacks.

It is another object of this invention to provide a friction clutch for motor vehicles with a dish-spring which will have a practically constant torque measured over the wearing range of the lining of the follower disc.

It is another object of this invention to provide a friction clutch as set forth above, in which the lever means for the clutch are so arranged that a proper mounting will also be assured at a high degree of non-uniformity of the rotary movement of internal combustion engines equipped with such friction clutch.

It is a further object of this invention so to suspend the individual leg springs generally present in friction clutches of the above-mentioned type and employed for mounting the pressure member on the inner lever ends that no additional fastening or connecting means are necessary for the mounting of said springs.

A still further object of this invention consists in so designing the clutch that it can easily be assembled and disassembled, while the manufacturing costs will be considerably lower than is the case with heretofore known clutches of the type involved.

It is also an object of this invention to provide an optimum cooling of the dish spring and the parts adjacent thereto.

These and other objects and advantages of the invention will appear more clearly from the following specification in connection with the accompanying drawings, in which.

Figure 1:
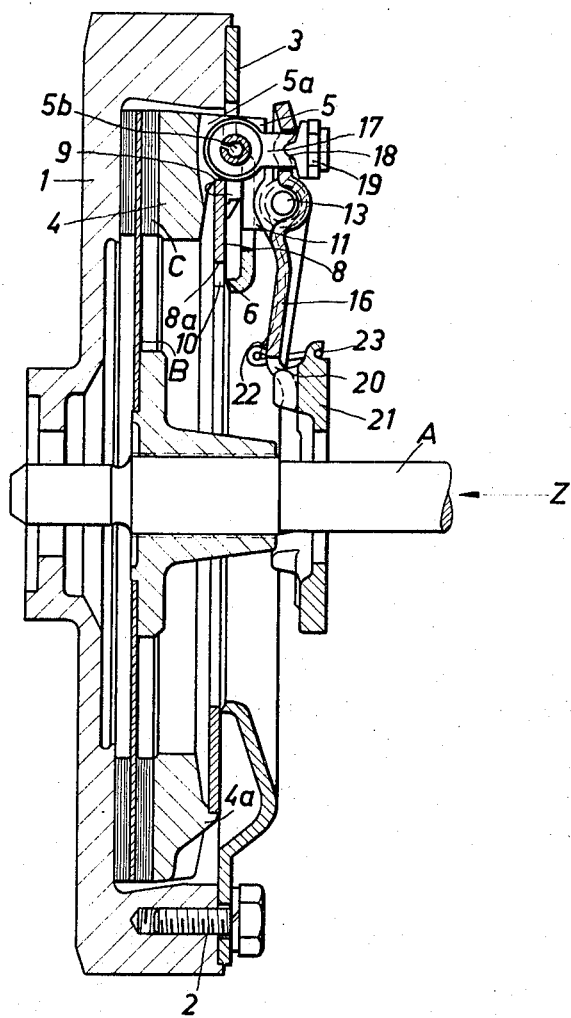
FIGURE 1 is an axial section through a clutch according to the present invention.
Figure 2:
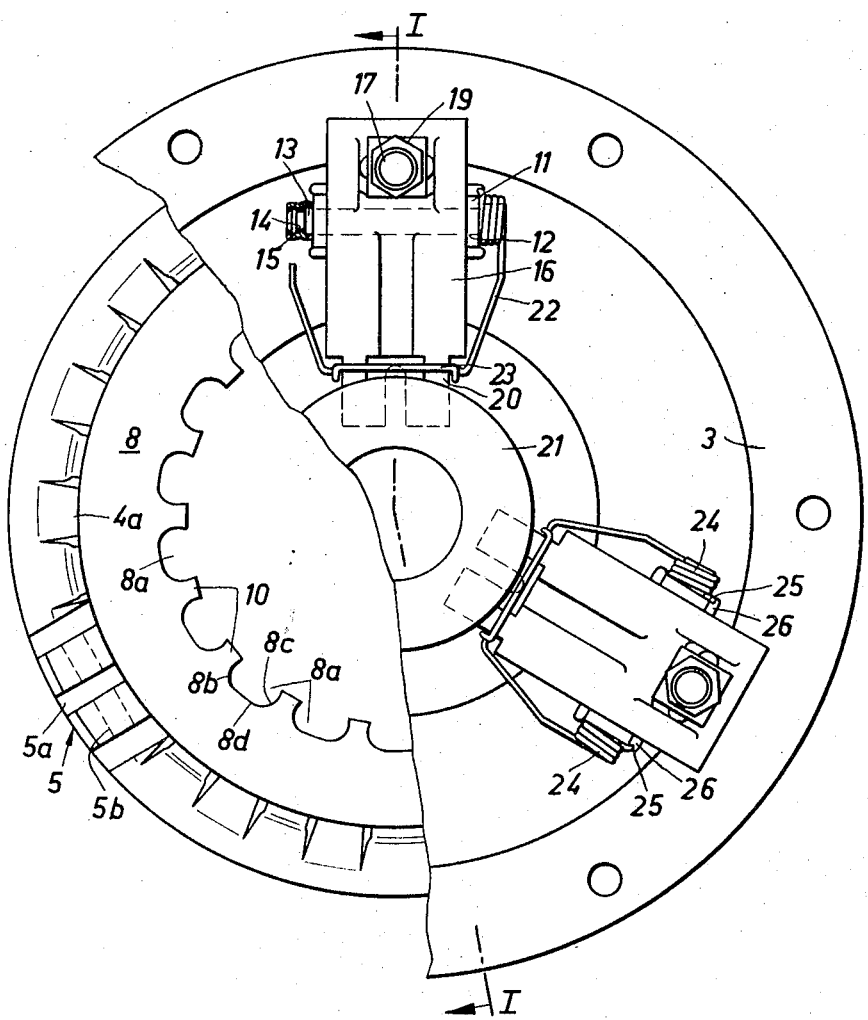
FIGURE 2 shows the clutch of FIGURE 1 as seen in the direction of the arrow Z, the left-hand portion of FIGURE 2 showing the clutch broken open, i.e. with the cover removed.

The friction clutch according to the present invention is characterized primarily in that the dish spring is provided with recesses near its inner marginal portion, said recesses being formed by rectangles with rounded corners which are so arranged that the shorter sides are located approximately radially while the material located between adjacent recesses forms tongues for resting on the inner marginal portion of the cover. The friction clutch according to the invention is furthermore characterized in that the radial extension of the recesses amounts to at least 20% but not more than 40% of the radial total depth of the dish spring including the tongues. With the friction clutch according to the present invention, the bolts are mounted on plate portions bent out of the cover, and both ends of the bolts protrude beyond said plate portions for safely supporting the windings of the leg springs.

According to a further development of the present invention, the dish spring is centered by means of cams uniformly distributed over the circumference of the pressure plate. A favorable mounting of the leg springs which will be safe and not subjected to the harmful influence of centrifugal forces, is obtained by providing the ends of the bolts with grooves and placing bushings over said bolt ends for supporting the windings of the leg springs which are pressed into the grooves of said bolts. This type of connection makes it possible to fasten the leg springs without the necessity of employing cotter pins. Preferably, the springs are U-shaped and the spring windings are formed at the ends of the spring legs.

Referring now to the drawings in detail, the clutch arrangement illustrated therein comprises a flywheel 1 adapted to be connected to the crankshaft of an engine. A cover 3 is by means of screws 2 non-rotatably connected to flywheel 1. A pressure plate 4 is by means of cams 5 non-rotatably but axially displaceably mounted in cover 3. Between the inner edge 6 of cover 3 and the supporting bead 7 of pressure plate 4 there is arranged a dish spring 8 the centering of which is effected by means of a seat 9 provided on pressure plate 4. Said seat 9 is formed by cams 4a uniformly distributed over the circumference of pressure plate 4. The inner marginal area of dish spring 8 is provided with approximately rectangular recesses 8a and tongues 10. The shorter sides 8c of said rectangular recesses extend approximately in radial direction and through rounded areas 8b merge with the longer sides 8d. However, it is to be noted that the recesses 8a may also have a different contour, for instance an elliptic contour. In such an instance, however, it is important that the longer axis of the ellipse extends in circumferential direction. The tongues 10 are formed by the material between adjacent recesses 8a and serve for supporting the dish spring 8 with regard to the inner marginal portion 6 of cover 3. The recesses 8a are so designed that between the inner edge portion 6 of cover 3 and dish spring 8 there will be formed a sufficiently large air passage whereby an optimum cooling of the dish spring 8 will be assured. The recesses 8a also favorably affect the pressure distribution of the dish spring 8 inasmuch as an approximately constant pressure prevails over the entire working range of the clutch.

As will be seen from the drawings, cover 3 has bent-out portions 11 which are provided with bores 12 into which bolts 13 are pressed. For purposes of securing bolts 13 against movement in axial direction, the ends of bolts 13 are provided with grooves 14 having mounted thereon bushings 15 which are pressed into grooves 14 on bolts 13. Such an arrangement of securing the bolts in axial direction is superior to the provision of cotter pins and permits a simpler and faster assembly. Moreover, in this way it will be prevented that pins will be damaged during the assembly whereby the clutch may be damaged during operation.

Provided on bolts 13 between the bent-out portions 11 there are rotatably mounted levers 16. The connection between levers 16 and pressure plate 4 is effected by tie rods 17 which are operatively connected to levers 16 by intermediate members having edges 18 and by nuts 19. A pressure member 21 engages the radially inwardly located lever ends 20. As will be seen from the drawings, pressure member 21 is by means of leg springs 22 and through yokes 23 pressed against the lever ends 20. Leg springs 22 have coiled sections 24 by means of which they rest on the ends of bolts 13 or the bushings 15 mounted thereon. The hook-shaped ends 25 of said leg springs are suspended in recesses 26 which are formed when stamping out cover 3 and bending the portions 11. In this way a lateral movement of windings 24 over the bolt ends or bushings 15 will be prevented.

A friction clutch according to the present invention will in a surprising manner have an extremely uniform torque measured over the path over which the lining wears, while at the same time the leg springs are mounted so as to be non-sensitive against unfavorable centrifugal forces.

It is, of course, to be understood that the present invention is, by no means, limited to the particular arrangement shown in the drawings but also comprises any modifications within the appended claims.

What I claim is:

1. A friction clutch for motor vehicles, which includes: an output shaft, a flywheel adapted to be connected to a driving shaft of an engine and provided with a peripheral annular flange, annular cover plate means connected to the free end face of said flange, follower disc means arranged within said flange and connected to said output shaft for rotation therewith, pressure disc means axially displaceably arranged within said flange and operable selectively to be moved into and out of frictional driving connection with said follower disc means, annular dish spring means supported by said pressure disc means and having its inner marginal portion provided with circumferentially spaced recesses so as to form substantially radially inwardly extending and circumferentially spaced tongues, the inner end portions only of said tongues being engaged by the inner edge portion of said cover plate means so that between the inner edge portion of said cover plate means and the inner edge portions of said recesses there will be formed air passage means for cooling said dish-spring means, the radial extension of said recesses amounting to from 20% to 40% of the total radial extension of said dish spring means, a plurality of two-arm lever means pivotally supported by said cover plate means, each of said two-arm lever means having a first arm and a second arm respectively extending radially outwardly and radially inwardly from the pivotal connection of the lever arm means with said cover plate means, means operatively connecting the first arms of said two-arm lever means with said pressure disc means, and a pressure member movable relative to and in axial direction of said output shaft and operatively connected to the second arms of said two-arm lever means and operable selectively to actuate said pressure disc means through said two-arm lever means for disengaging the clutch.

2. A friction clutch according to claim 1, in which the radial extension of said tongues amounts to approximately 33% of the total radial extension of said dish spring means.

3. A friction clutch according to claim 1, in which said radially inwardly extending tongues are separated by cutouts of substantially rectangular shape open toward the inside of said dish spring means and having its corners rounded, the shorter sides of said cutouts extending substantially in radial direction of said dish spring means.

4. A friction clutch according to claim 1, in which said cover plate means is provided with circumferentially spaced pairs of ears, the ears of each pair being spaced from each other, pivot means supported by said ears while laterally protruding beyond the same and pivotally supporting said two-arm lever means, lever spring means supported by the laterally protruding portions of said pivot means for yieldingly holding said two-arm lever means in operative engagement with said pressure member, the protruding portions of said pivot means being provided with grooves, and bushing means resting in said grooves and supporting adjacent portions of said lever spring means.

5. A friction clutch according to claim 4 in which the lever spring portions supported by said bushing means are coiled and connected to a U-shaped spring section extendings over said second lever arms.

6. A friction clutch according to claim 5, which includes a plurality of yoke means respectively provided between the pressure member and the respective adjacent U-shaped spring section and engaging said pressure member.

7. A friction clutch according to claim 4, in which those portions of the lever spring means which are supported by said bushing means are coiled and provided with a hook-shaped end engaging a recess in said cover plate means.

8. A friction clutch for motor vehicles, which includes: an output shaft, a flywheel adapted to be connected to a driving shaft of an engine and provided with a peripheral annular flange, annular cover plate means connected to the free end face of said flange, follower disc means arranged within said flange and connected to said output shaft for rotation therewith, pressure disc means axially displaceably arranged within said flange and operable selectively to be moved into and out of friction driving connection with said follower disc means, said pressure disc means having its outer marginal portion provided with circumferentially spaced axially extending protrusions extending with play through said cover plate means, annular dish spring means supported by said pressure disc means and having its inner periphery provided with substantially radially inwardly extending and circumferentially spaced tongues, the inner end portions of said tongues being engaged by the inner edge portion of said cover plate means, the radial extension of said tongues amounting to from 20% to 40% of the total radial extension of said dish spring means, a plurality of two-arm lever means pivotally supported by said cover plate means, each of said two-arm lever means having a first arm and a second arm respectively extending radially outwardly and radially inwardly from the pivotal connection of the two-arm lever means with said cover plate means, a plurality of tie-rod means corresponding in number to the number of said two-arm lever means and pivotally connected to said protrusions while extending with play through the respective adjacent first lever arms, each of said first lever arms being provided with depression means, a plurality of intermediate members respectively mounted on said tie-rod means and provided with an edge-shaped portion respectively engaging the depression means of the respective adjacent first lever arm pertaining thereto, a plurality of nut means respectively mounted on said tie-rod means for holding said intermediate members in engagement with the respective adjacent depression means, and a pressure member movable selectively to and in axial direction of said output shaft and operatively connected to the second arms of said two-arm lever means and operable to selectively actuate said pressure disc means through said two-arm lever means and said tie-rod means for disengaging the clutch.

References Cited

UNITED STATES PATENTS

| | | | |
|---|---|---|---|
| 2,037,610 | 4/1936 | Worner | 192—68 |
| 2,071,588 | 2/1937 | Swennes et al. | 192—68 X |
| 2,810,464 | 10/1957 | Geibel | 192—109 |
| 2,952,453 | 9/1960 | Haussermann | 192—89 X |
| 3,211,265 | 10/1965 | Crutchley | 192—99 X |
| 3,254,747 | 6/1966 | Werner | 192—68 X |

CARLTON R. CROYLE, *Primary Examiner.*

ARTHUR T. McKEON, *Examiner.*